D. M. CAMPBELL AND H. E. LITTLE
TIRE PATCH.
APPLICATION FILED MAY 10, 1920.
1,381,966.
Patented June 21, 1921.
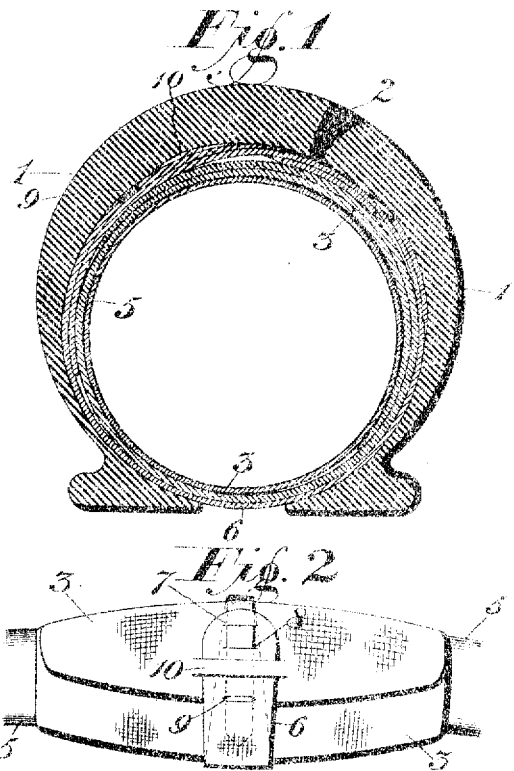
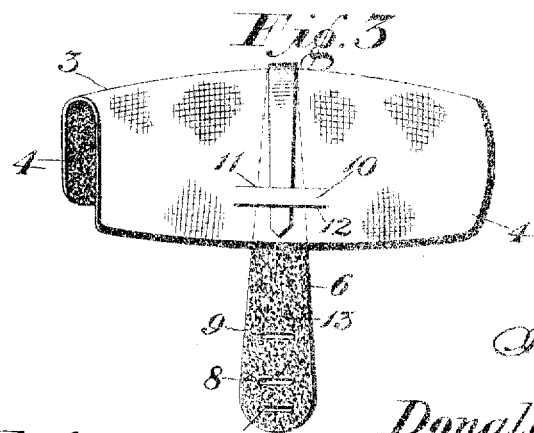
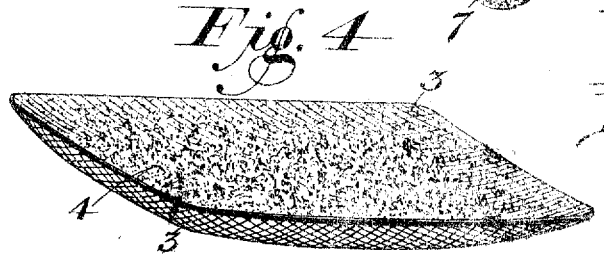
Inventors
Donald M. Campbell
and
Harry E. Little
By E. E. Overholt
Attorney

UNITED STATES PATENT OFFICE.

DONALD M. CAMPBELL AND HARRY E. LITTLE, OF WICHITA, KANSAS.

TIRE-PATCH.

1,381,966.   Specification of Letters Patent.   Patented June 21, 1921.

Application filed May 10, 1920. Serial No. 380,242.

*To all whom it may concern:*

Be it known that we, DONALD M. CAMPBELL and HARRY E. LITTLE, citizens of the United States, residing at Wichita, in the county of Sedgwick and State of Kansas, have invented certain new and useful Improvements in Tire-Patches, of which the following is a specification.

Our invention relates to tire patches of the self vulcanizing variety.

Our general object is to provide a patch for use with automobile tires in case of broken places and blow-outs in the outer casing.

More specifically speaking, our object is to provide a patch of this character made of several plies of tire building fabric vulcanized together and adapted to be wrapped around the inner tube, and held with a self adjusting strap.

A further object is to provide a tire patch of the above character having its inner surface frictionized with a skim coat of self vulcanizing rubber, so that when the patch is wrapped around the inner tube and placed in the casing, the skim coat will, from the frictional heat created while the case is running, semi-vulcanize to the inner tube, thus making the patch slip-proof on said tube and thereby holding it permanently over the broken place in the tire.

A still further object is to also provide the inner face of the self-adjusting strap with a skim coat of self vulcanizing rubber, so that when the inner tire, the patch, and the outer casing have all adjusted themselves to each other after the tire has been inflated to running pressure, the strap will also become semi-vulcanized to the patch to hold it permanently in position around the inner tube.

The invention consists in the novel construction and arrangement of the several parts, as will be hereinafter described and claimed, reference being had to the accompanying drawings, in which:

Figure 1 illustrates a section through an automobile tire provided with our improvement. Fig. 2 is a view on a somewhat smaller scale showing the patch secured around the inner tube with the adjustable strap, ready to be placed in the outer casing. Fig. 3 is a side elevation of the patch just before it is placed on the inner tube; and Fig. 4 is an inverted view of the patch when open.

The numeral 1 indicates the outer casing of an automobile tire having a blow-out opening 2 therein; and 3 indicates the patch which is formed of any desired number of plies of tire-building material vulcanized together. The patch 3 when in operative position, is somewhat oval or melon shaped, being of less diameter at the ends. When opened out, it is concave on one side and convex on the other, as illustrated in Fig. 4 of the drawings. It is made thicker at the middle and becomes thinner as its edges are approached, and is provided on its inner or concave side with a skim coat 4 of self-vulcanizing rubber, which causes the patch to eventually adhere to the inner tube 5, around which it is wrapped.

The strap 6 is made somewhat broad at one end and tapers gradually to the other end, and is also provided on its inner side with a coat 13 of self-vulcanizing rubber just as is the patch.

The patch is provided near one edge of its outer face with a raised strap-band 10, which is preferably integral with the patch, being formed by means of the slits 11 and 12 which extend only through one or two plies of the material out of which the patch is made.

When in operative position, the broad end of the band 6 is passed through the slots 11 and 12 underneath the band 10, as illustrated in Fig. 2, and the narrow end of the strap is then passed through as many of the slots 7, 8, and 9, as may be desired.

In operation, the patch is wrapped around the inner tube and secured with the strap 6 as illustrated in Fig. 2. The narrow end of the strap is passed through only as many of the openings or slits 7, 8, and 9, as may be found necessary to prevent it from yielding too freely to the pressure from within when the inner tube is inflated to running pressure. The number of the slits 7, 8, and 9, through which the narrow end of the strap 6 should be passed, will depend somewhat upon the quality and the quantity of the self-vulcanizing rubber which forms the inner face 13 of the strap. In Fig. 2, the end of the strap is shown as passed through the slots 7 and 8 only. When the patch is properly strapped around the inner tube, these parts are then placed inside the outer casing with the thickest part of the patch over the broken place or blow-out.

When the inner tire is inflated to running pressure, the patch will prove to be self-adjusting, since the strap will slip or give enough to permit the patch to expand to the inner size of the casing, at which point the pressure between the several parts will prevent further slipping, and the frictional heat caused by running, will cause the strap to become semi-vulcanized to the patch and the patch will in like manner become semi-vulcanized to the inner tube; and thus all the parts will be perfectly adjusted to each other, and the inner tube, the patch, and the securing strap, will be molded together, as it were into one piece.

Having now described our invention, what we claim as new and desire to secure by Letters Patent is:—

1. In devices of the character described, a patch formed of tire-building material and adapted to be wrapped around the inner tube of a resilient tire; and a self-adjusting strap for securing the patch around said inner tube.

2. A device of the character described, comprising a patch formed of tire-building material having its inner surface provided with a coat of self-vulcanizing rubber and adapted to be wrapped without tying around the inner tube of a tire; and a self-adjusting strap yieldingly secured to the patch in frictional engagement therewith for holding the patch around said inner tube.

3. A device of the character described, comprising a patch formed of tire-building material and adapted to be wrapped around the inner tube of a resilient tire; and a securing strap for the patch, said strap being yieldingly secured in frictional engagement with the patch and provided on its inner side with a coat of self-vulcanizing rubber.

4. A device of the character described, comprising a patch formed of tire-building material and adapted to be wrapped around the inner tube of a resilient tire; and a self-adjusting securing strap for the patch yieldingly held in frictional engagement therewith and provided on its inner side with a coat of self-vulcanizing rubber.

5. A device of the character described, comprising a patch formed of tire-building material having its inner surface provided with a coat of self-vulcanizing rubber and adapted to be wrapped around the inner tube of a tire; and a self-adjusting strap yieldingly held around said patch for holding the patch around said inner tube, said strap also having a coat of self-vulcanizing rubber on its inner side.

6. A device of the character described, comprising a patch formed of a plurality of plies of tire building material and adapted to be wrapped around the inner tube of a resilient tire; a securing strap for the patch, said patch having a raised strap-band formed by parallel slits extending through a part of the plies of the patch, said securing strap being passed under said raised band and yieldingly secured around the patch, and provided on its inner face with a coat of self vulcanizing material, whereby the patch is automatically adjusted to the inner tube according to the balance of force between the inflating power of the inner tube and the resistance offered by the outer casing to the inflation of said inner tube.

In testimony whereof we affix our signatures.

DONALD M. CAMPBELL.
HARRY E. LITTLE.